Figure 1:
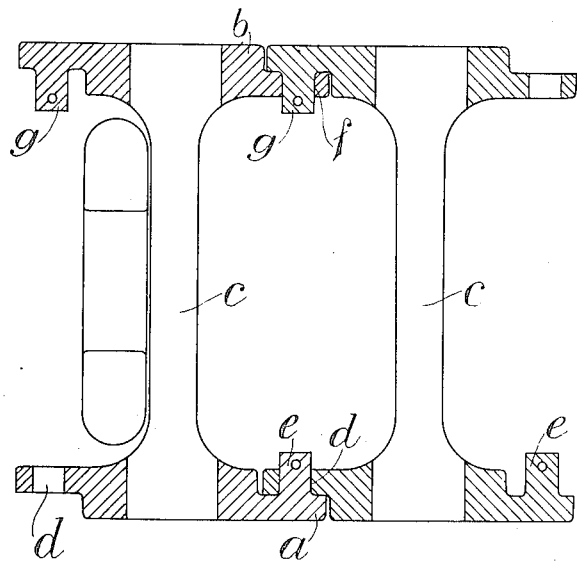

A. REDLER.
CHAIN FOR BIN DISCHARGERS AND CONVEYERS.
APPLICATION FILED SEPT. 27, 1921.

1,433,567.

Patented Oct. 31, 1922.

INVENTOR:
Arnold Redler
By Wm Wallace White
ATTY.

Patented Oct. 31, 1922.                                                      1,433,567

UNITED STATES PATENT OFFICE.

ARNOLD REDLER, OF SHARPNESS, ENGLAND.

CHAIN FOR BIN DISCHARGERS AND CONVEYERS.

Application filed September 27, 1921. Serial No. 503,657.

*To all whom it may concern:*

Be it known that I, ARNOLD REDLER, of Sharpness, in the county of Gloucester, England, a subject of the King of Great Britain and Ireland, have invented certain new and useful Improvements in or Relating to Chains for Bin Dischargers and Conveyers, of which the following is a specification.

This invention relates to chains for bin dischargers and conveyers.

A chain made in accordance with this invention comprises links formed with two or more longitudinal parallel members and one or more transverse members. The ends of two or more of the longitudinal members are pivotally connected to adjoining links. One side of the longitudinal members is concave; the outer side is flat or curved.

The bars of the links are of little depth and close together, just far enough apart to prevent the flour bridging between the bars and close enough to prevent the material slipping over the bars which happens when the bars are far apart.

The bars are of little depth to allow the chain to be drawn through the material when choked. When loaded and free to travel the chain will draw along material piled up on the chain. When choked the chain automatically reduces its load to the thickness of the chain, the chain being thick enough to move the material when free and small enough to permit, the power required to move a loaded chain, being sufficient to move the chain through a blocked passage.

The slats or rods may be $\frac{1}{4}''$ to $\frac{1}{2}''$. I have found slats $\frac{3}{8}''$ placed $4''$ apart give the best results.

One form of chain made in accordance with this invention is formed of links having two parallel longitudinal members and one transverse member.

The hinges are constructed by the ends of the links being rebated or halved into each other and the connection being provided by means of a pin formed on one rebate and adapted to fit in a hole in the rebate of the next link. The arrangement can be so carried out that the outsides of the links can be in alignment without projecting pins, the ends of the pins being inside the link and drilled to receive split pins to keep the links from coming apart. The arrangement can be modified for the ends of the pins and split pins to be on the outside but this would not need to be done unless for some special reason regarding a particular drive. It will thus be seen that each link is a unit and which is slipped sideways into the next link and held in position by two split pins (one for each side) thus forming a double holdfast.

Referring to the drawings filed herewith:—

Figure 2:
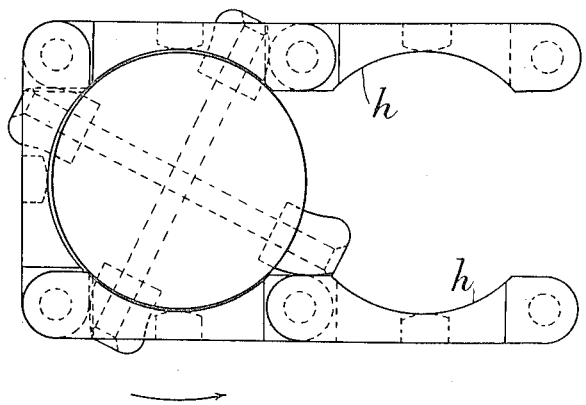

Fig. 1 is a plan of two links of one form of chain made in accordance with this invention;

Fig. 2 is an elevation showing five links passing round a driving toothed wheel of a diameter approximately equal to the pitch of the chain. The link is provided with two longitudinal members $a$ $b$ and one transverse $c$. The longitudinal member $a$ is provided with a hole $d$ and pin $e$ and the other longitudinal member $b$ with a hole $f$ and pin $g$. The links are readily assembled by transverse movement, the pin $e$ and hole $d$ slipping in or on the hole $f$ and pin $g$. The under side of the top run and the upper side of the under run are curved as at $h$, this curve may be the same radius as the pulley or smaller radius so that the link shown could work over a pulley having a diameter much greater than the pitch of the chain.

The sprocket wheel can be provided with four or more teeth according to the diameter and pitch of the chain.

The method of connecting the links together can be varied without departing from the spirit of the invention.

The curvature of the links furnishes another advantage when employed over wheels of greater diameter than the pitch of the links in conveyers or dischargers in that the surfaces of contact of the chain on the pulley and on the top runway, are of small dimensions thus lessening the tendency of the substance which is conveyed or discharged being squeezed between the links and the pulleys or between the links and the top runway over which the chain is pulled.

What I claim and desire to secure by Letters Patent is:—

1. A chain for bin dischargers and conveyers, composed of links, comprising at least one transverse member, a plurality of longitudinal parallel members rigidly connected to said transverse member and projecting on either side beyond the body of the link as constituted by the said transverse member, the projecting ends of the said longitudinal members on the same side of the said transverse member being alternately provided with a projecting pin and with an eye respectively, said pins and eyes being adapted to engage coresonding eyes and pins provided on the projecting ends of the longitudinal members of the next link.

2. A chain for bin dischargers and conveyers, composed of links as claimed in claim 1, in which the pins project inwardly.

3. A chain for bin discharges and conveyers, composed of links as claimed in claim 1, the longitudinal members of which are concave on one side so as to bed exactly on any plain, smooth wheel or drum over which the chain is adapted to pass, without requiring said wheel or drum to be notched or otherwise specially shaped to accommodate the chain.

In testimony whereof I have signed my name to this specification.

ARNOLD REDLER.